March 4, 1969     G. TITT     3,430,458
DEVICE FOR TRANSMITTING ROTARY MOVEMENT AND METHOD
FOR MANUFACTURING THE SAME
Filed Dec. 30, 1966
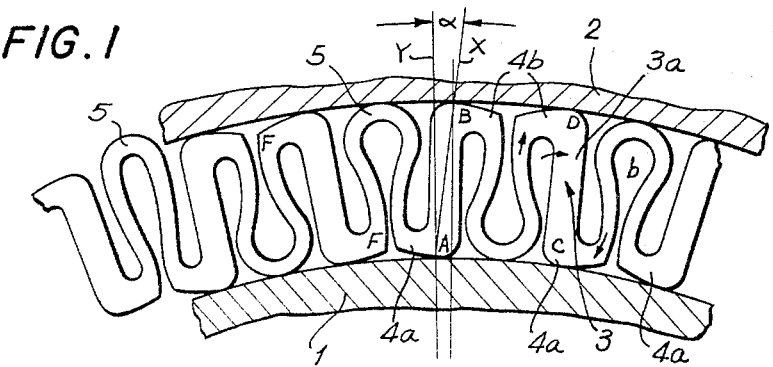
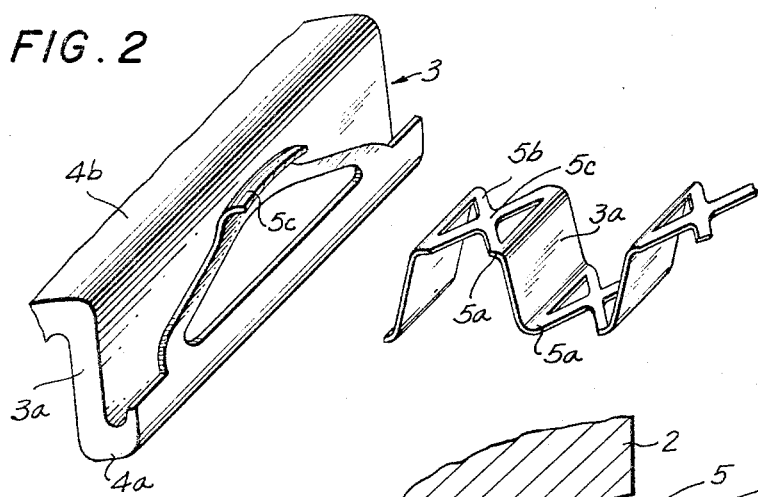
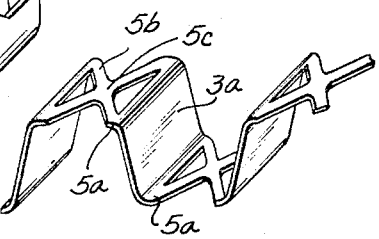
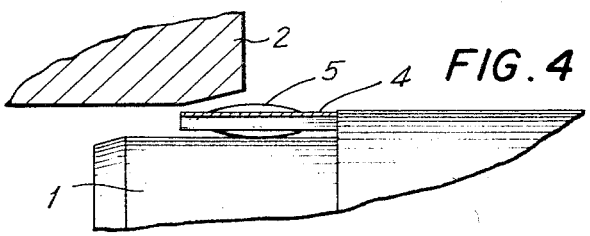
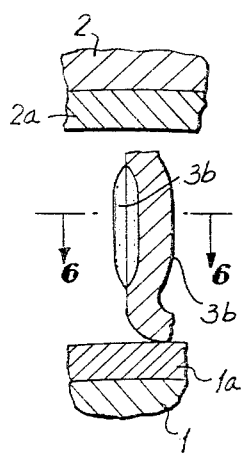
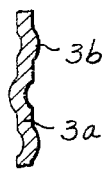
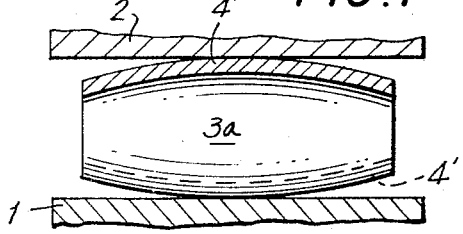
INVENTOR.
GEORG TITT
BY *Steinberg & Blake*
ATTORNEYS United States Patent Office 3,430,458
Patented Mar. 4, 1969

3,430,458
DEVICE FOR TRANSMITTING ROTARY MOVEMENT AND METHOD FOR MANUFACTURING THE SAME
Georg Titt, 5 Westendstrasse, 808 Furstenfeldbruck-Buchenau, Germany
Filed Dec. 30, 1966, Ser. No. 606,468
U.S. Cl. 64—15    17 Claims
Int. Cl. F16d 3/56; B21f 37/00

ABSTRACT OF THE DISCLOSURE

A device for transmitting rotary movement between an inner member and an outer member which surrounds and is spaced from the inner member to define therewith an annular space in which the device is located. The device has a plurality of transmission means situated in and distributed along the annular space between the inner and outer members with the plurality of transmission means wedged against these members to transmit rotary movement therebetween, and each transmission means transmitting rotary movement in an opposite direction from an immediately preceding and an immediately following transmission means.

---

The present invention relates to devices for transmitting rotary movement between a pair of members.

Such devices are in general well known and take many different forms. For example, devices of this type are known in overrunning clutches which will transmit rotary movement in one direction from one member to another while permitting one of these members to turn freely in the opposite direction with respect to the other member without any rotary movement being transmitted therebetween. The device of the present invention differs from such overrunning clutches in that it will transmit rotary movement between a pair of members in both directions of rotation.

In most known constructions of the above type the devices for transmitting the rotary movement include tapered or conical bodies which are pressed against each other by suitable screws, or the devices include tapered or conical springs similar to cup springs which also are required to be stressed by the tension derived from suitable screws. These conventional constructions have the common disadvantage, primarily, of requiring a series of screws for interconnecting the motion-transmitting elements, and all of these screws must be uniformly stressed and must provide a predetermined turning moment. As a result it is not only time-consuming and costly to manufacture these devices but in addition their assembly is also time-consuming and expensive.

A further disadvantage of those constructions which include tapered springs, similar to cup springs, resides in the fact that they very easily cut into the surfaces of the members between which the rotation is transmitted because these elements have a substantially line-contact with the members between which the rotation is transmitted and thus form scratches and dig into the surfaces of the members between which the rotation is transmitted.

A primary object of the present invention is to provide a device which will avoid the above drawbacks and which at the same time is capable of transmitting rotary movement in both directions between a pair of members.

In particular, it is an object of the invention to provide a device of this type which does not require any screws or the like to interconnect the motion transmitting components and which is far simpler and less expensive, both with respect to time and with respect to cost, to manufacture and assembly, as compared to conventional devices of the above type.

An additional object of the present invention is to provide a device of this type which includes a spring structure which will maintain the motion transmitting components of the device at all times in wedged engagement with the members between which the rotation is to be transmitted.

Also, it is an object of the present invention to provide a device of this type which consists only of a one-piece endless band which is of ring-shaped configuration and situated in an annular space defined between inner and outer members between which the rotation is to be transmitted.

Furthermore, it is an object of the present invention to provide a construction where a plurality of spring means will urge a plurality of successive transmission means apart from each other with the plurality of spring means initially prestressed when the device is assembled with the inner and outer members between which the rotary movement is to be transmitted.

Thus, in accordance with the invention the device for transmitting rotary movement between an inner member and an outer member which surrounds and is spaced from the inner member to define an annular space therewith includes a first group of transmission means distributed along and situated in this annular space while being wedged against the inner and outer members and a second group of transmission means which respectively alternate with the first group and which also are distributed along and situated in the annular space pressed in wedging engagement with the inner and outer members, the first group of transmission means transmitting rotation in one direction between these members while the second group of transmission means transmits rotation in the opposite direction between these members, and the several transmission means all being symmetrically arranged one with respect to the next.

The invention is illustrated by way of example in the accompanying drawings which form part of this application and in which:

FIG. 1 is a fragmentary transverse end view of one possible embodiment of a device according to the invention, FIG. 1 fragmentarily showing in a transverse section the inner and outer members between which rotation is to be transmitted and FIG. 1 also showing at its left portion the condition of the device of the invention when it is unstressed;

FIG. 2 is a fragmentary perspective illustration showing the details of part of the device of the invention;

FIG. 3 is a fragmentary perspective illustration showing the condition of the device of the invention during an intermediate stage in the manufacture thereof according to the method of the present invention;

FIG. 4 is a fragmentary side elevation illustrating how the device of the invention is assembled with the members between which rotation is to be transmitted, the outer member being fragmentarily illustrated in section while the inner member is fragmentarily shown in side elevation and the device of the invention is shown in longitudinal section during assembly with the inner and outer members;

FIG. 5 is a fragmentary transverse sectional illustration of another embodiment of a device according to the invention;

FIG. 6 is a sectional plan view of the structure of FIG. 5 taken along line 6—6 of FIG. 5 in the direction of the arrows; and FIG. 7 is a longitudinal sectional fragmentary view of still another embodiment of a device according to the present invention.

Referring to FIG. 1, there is fragmentarily shown therein, in section, an inner member 1 and an outer member 2 between which rotation is to be transmitted by the device of the invention. The inner member 1 may take the form of a suitable shaft while the outer member 2 may form a hub of a machine element, this hub being of circular configuration and surrounding the shaft 1 while being spaced therefrom to define therewith an annular space in which the device of the invention is located. The device of the invention is of ring-shaped configuration and is situated in the annular space between the members 1 and 2. This device of the invention includes a plurality of transmission means 3 which are situated in the annular space while being pressed into wedging engagement with the inner and outer members 1 and 2. Each transmission means 3 has an inner portion 4a pressing against the inner member 1 and an outer portion 4b pressing against the outer member 2, and between its inner and outer portions each transmission means 3 has an intermediate plate portion 3a which extends parallel to but is inclined with respect to a plane which contains the axis around which all of the transmission means are distributed. When the inner and outer members 1 and 2 are in coaxial alignment, their common axis will coincide with the axis around which the plurality of transmission means 3 are distributed. The inner and outer portions 4a and 4b of each transmission means 3 are in the form of lateral projections which respectively extend in opposed circumferential directions about the axis around which the plurality of transmission means 3 are distributed. Furthermore, each inner portion 4a and outer portion 4b of each transmission means 3 is curved around an axis which is parallel to the axis around which the plurality of transmission means 3 are distributed, but the radius of curvature of each inner portion 4a and outer portion 4b is greater than the corresponding radius of curvature of a conventional wedged motion transmitting element of a conventional overrunning clutch.

The several transmission means 3 are arranged in two groups with the plurality of transmission means of one group alternating with the plurality of transmission means of the other group and being inclined oppositely with respect thereto so that with the device of the invention each transmission means is symmetrically arranged with respect to the immediately preceding and immediately following transmission means. Because of the opposed inclinations of the successive transmission means 3, each transmission means 3 defines with the immediately preceding transmission means a space which tapers in one direction with respect to the central axis of the device and with the immediately following transmission means a space which tapers in the opposite direction with respect to the central axis, so that each of these tapered spaces situated between each pair of successive transmission means has a narrow end and an opposed wide end. The arrangement of the components of the device of the invention is such that the lateral projections 4a and 4b are always situated at the narrow end of the tapered space with the lateral projections of successive transmission means 3 extending toward each other at the narrow end of each space. It is possible to provide the lateral projections 4a and 4b with the radii of curvature greater than those of conventional motion transmitting elements of overrunning clutches because each transmission means 3 has a certain elasticity all the way up to the end F of each lateral projection thereof, so that in this way an undesirably large increase in the wedging angle of the transmission means, during loading thereof, can be reliably avoided.

Under certain circumstances it is possible to provide the outer surfaces of the lateral projections 4a and 4b with straight configurations, where narrow tolerances are adhered to by grinding the opposed outer surfaces of the lateral projections 4a and 4b.

As may be seen from FIG. 1, each transmission means 3 is situated substantially in a plane X which contains the lines of engagement of each transmission means with the inner and outer members 1 and 2, and this plane X forms an angle $\alpha$ with a plane Y which contains the central axis around which the plurality of distributing means 3 are distributed and which also contains one of the lines of engagement of the transmission means 3 with one of the members 1 and 2. This angle $\alpha$ is the initial clamping or wedging angle of each transmission means and it is possible to make this angle larger than the corresponding angle of comparable overrunning clutches since the device of the invention need not be lubricated so that large friction angles can be provided with the device of the invention.

A plurality of spring means 5 are respectively situated in the spaces between the successive series of transmission means 3 and are operatively connected therewith for urging them apart from each other. As is apparent from FIG. 1 each spring means 5 has a substantially keyhole configuration in a plane which is perpendicular to the central axis, and each spring means 5 has at the narrow end of each tapered space a pair of legs integrally joined to and extending from the lateral projections at the narrow end of the tapered space, while the curved portion of each spring means 5 which is distant from its legs is situated at the wider end of each tapered space and presses against the adjoining member 1 or 2 so as to be prestressed thereby and thus constantly urge the plurality of transmission means 3 into wedging frictional engagement with the members 1 and 2. Thus, the plurality of spring means 5 not only function to interconnect the series of transmission means 3 with each other, but in addition they also serve to prestress the plurality of transmission means 3 in the wedging or motion-transmitting direction thereof. In order to achieve this latter result the length of each transmission means 3 between its inner and outer portions 4a and 4b is less than the length of each spring means 5 between inner and outer portions thereof, in the unstressed condition of the device which is shown at the left of FIG. 1. Because of this greater length of the spring means 5 in the radial direction with respect to the central axis, as compared to each transmission means 3, when the structure is introduced into the annular space between members 1 and 2, this space having a radial width which is even less than the length of each transmission means 3 between its inner and outer portions, the plurality of spring means 5 will be necessarily compressed to the configuration shown in FIG. 1 between the members 1 and 2, thus giving the members 5 their keyhole configuration and prestressing them so that they constantly urge the plurality of transmission means 3 into wedging engagement with the members 1 and 2. This feature is also illustrated in FIG. 4 where the inwardly and outwardly bulging portions at the free ends of the several spring means 5 are illustrated before they are compressed by the assembly of the components according to which the shaft 1 will be displaced to the left in FIG. 4 and the hub 2 displaced to the right in order to compress the plurality of spring means 5 in the annular space between the members 1 and 2. Thus, the curved bulging portions of the spring means 5 shown in FIG. 4 correspond to the outwardly projecting portion of the left spring means 5 which is shown in FIG. 1.

Thus, an endless band according to the invention, which is made of a continuous series of successive transmission means 3 and spring means 5, can be assembled in the simplest way with the members 1 and 2 in the annular space therebetween. The band which forms the device of the invention and which can initially be manufactured in endless form and which can even initially extend in a straight direction is during assembly conformed to the diameter of the shaft 1 and rendered more rigid as a result of the assembly. The assembly to provide a construction as shown in FIG. 1 can very simply take place by placing the endless band around the shaft 1, as indicated in FIG. 4, and then the band together with the shaft are axially displaced with respect to the outer member 2 so as to situate the device of the invention in the annular space between the members 1 and 2. As is apparent from FIG. 4, the plurality of spring means 5 have at their free end exterior convex surfaces which are curved about an axis perpendicular to the axis of the shaft 1, and the axial displacement can take place without any resistance until the exterior crests of the exterior convexly curved surfaces of the several spring means 5 engage both the shaft 1 and the outer member 2. Thus, up to approximately a central transverse plane situated between the opposed ends of the device of the invention there will be substantially no resistance to the assembly, while from this point on the outer crests of the plurality of spring means 5 will be pressed against the surfaces of the members 1 and 2 so that from this point on it is necessary to exert a certain pressure in order to complete the assembly during the continued axial displacement of the parts 1 and 2 with respect to each other.

Thus, because the plurality of spring means in their unstressed condition project beyond the limits of the radial width of the annular space in which the device of the invention is thereafter located, the assembly of the device of the invention with members 1 and 2 necessarily results in the compression and prestressing of the plurality of spring means. As a result the plurality of transmission means 3 are at the same time set automatically at their proper wedging angles.

The device of the present invention, which takes the form of an endless band, also lends itself to an extremely simple and highly advantageous method of manufacture according to the present invention. Thus, it is possible to manufacture the device of the present invention even though initially it is formed from a band of uniform thickness and width, this endless band being compressed in a suitable press and having portions thereof stamped out so as to form openings in the band, in such a way that the successive transmission means and spring means which alternate with each other along the band can be very readily manufactured while at the same time the plurality of transmission means 3 will have different bending resistance as compared to that of the plurality of spring means 5. The pressure which is applied to the initial band so as to compress portions thereof and thus reduce the thickness of these portions is made of such a magnitude that the corresponding lengthening of the thus-compressed portions will provide the plurality of spring means with their lengths which in the radial direction are greater than the corresponding lengths of the plurality of transmission means 3. Thus, as is particularly apparent from FIG. 2, it will be seen that each spring means 5 is considerably thinner than each transmission means 3.

In carrying out the method of the invention, the initial spring steel endless band which has a uniform width and a uniform thickness corresponding to the thickness of the final transmission means 3 is first bent into the wavy configuration indicated in FIG. 3 so as to have successive oppositely directed U-shaped portions providing the band which is bent in this way with successive inner and outer wall portions 5a and with successive plate portions 3a interconnecting the successive inner and outer wall portions 5a, as indicated in FIG. 3. These wall portions 5a are then stamped in a suitable press so as to have portions thereof removed, thus forming the cutouts which give the walls 5a the X-shaped configuration in their flat or substantially flat condition shown in FIG. 3. Thus, each wall 5a will be composed of a pair of intersecting bar portions 5b which at their intersection form the portion 5c which ultimately becomes the bulging intermediate portion of the spring means which has the exterior convex surface pressing against the member 1 or the member 2. After stamping out these portions of the walls 5a, so as to reduce the cross section of these walls, they are compressed in a suitable press so as to have their thickness reduced and their length increased, this length being circumferentially from one plate 3a to the next plate 3a. In this way the plurality of spring means are formed interconnecting the plurality of transmission means. The plate portions 3a and their inner and outer edge portions which form the projections 4a and 4b remain at their initial thickness. Thus, each transmission means will have a substantially Z-shaped configuration the thickness of which is the same as the thickness of the initial band, and the interconnecting spring means are substantially thinner and have the X-shaped configuration. Thereafter the plurality of spring means are bent into the spaces between the plurality of successive transmission means to have initially the substantially U-shaped configuration shown at the left of FIG. 1 where the illustrated spring means 5 is unstressed, and of course this configuration will be changed during assembly into the substantially keyhole configuration which is illustrated between the parts 1 and 2 in FIG. 1.

Of course, instead of situating a single device of the invention in the annular space between the members 1 and 2, it is possible to arrange a plurality of these devices distributed axially in the annular space and having with respect to each other suitable constructional relationships in sizes which will result in the required transmission of rotation between the members 1 and 2, and of course in each case the plurality of transmission means 3 are uniformly distributed about the central axis.

When the members 1 and 2 are made of an extremely soft material, it is possible to press against their surfaces which define the annular space which receives the device of the invention relatively hard but thin rings 1a and 2a, indicated in FIG. 5, so that through these rings the forces are transmitted to the members 1 and 2 with a reduced specific pressure for each unit of pressure-transmission area. These rings 1a and 2a can be inexpensively manufactured from hardened spring steel bands.

Furthermore, as is indicated in FIG. 7, it is possible to provide for the lateral projections 4', which otherwise correspond to the lateral projections 4a and 4b of each transmission means 3, a curvature around an axis transverse to the central axis, in addition to their above-described curvature around axes parallel to the longitudinal or central axis, respectively, so that in this way these projections 4' of the embodiment of FIG. 7 will have exterior convexly curved surfaces which are curved about a transverse as well as about a longitudinal axis, thus permitting the device of the invention to adapt itself to rotary members 1 and 2 which do not have their axes precisely in alignment. Where one of these latter axes is inclined with respect to the other of these axes, a construction as shown in FIG. 7 will adapt itself to this lack of alignment. Thus, this construction makes it possible to replace with the inexpensive structure of the invention the expensive structure of a curved tooth-type of clutch which is used for interconnecting and transmitting rotation between a pair of rotary elements whose axes are respectively inclined or otherwise out of alignment with each other.

Finally, it is possible, as indicated in FIGS. 5 and 6, to reinforce the plate portions 3a of each transmission means 3 by providing these plate portions with reinforcing ribs 3b which are distributed along the central axis of the device and which extend substantially perpendicularly thereto. Thus, these reinforcing ribs, in the form of suitable corrugations, for example, will stiffen the plate portions 3a and enable them to be made of a thinner material.

The device of the invention operates in the following manner:

Referring to FIG. 1, when the shaft 1 rotates in a clockwise direction so that the device of the invention is to transmit the clockwise rotation to the outer member 2, the transmission will take place with one group of alternating transmission means 3 in which the force will be transmitted from the point A to the point B with the transmission means compressed between these points. The other group of transmission means is not stressed at this time but nevertheless it is maintained in its initial wedging engagement with the members 1 and 2 as a result of the prestress of the springs 5. When the direction of rotation is changed so that a counterclockwise direction of rotation of the member 1 is to be transmited to the member 2 which is also to be turned in a counterclockwise direction, then the transmission takes place between this other group of transmission means from the point C to the point D. At this time the group of transmission means 3 which transmit the clockwise rotation do not participate in the transmission of rotary movement but nevertheless are maintained in engagement with the members 1 and 2 as a result of the force of the spring means 5. It is to be noted that the several transmission means 3 are relatively stiff and rigid so that they will reliably transmit the turning moments between the members 1 and 2.

The force components a and b indicated in FIG. 1 act continuously to tend to turn the plurality of transmission means 3 into wedging motion-transmitting engagement with the members 1 and 2. This action takes place as soon as the spring means 5 is compressed between the members 1 and 2. This elastic interconnection between the several transmission means 3 would also serve to compensate for variations in the dimensions of the members 1 and 2, within given tolerances, and furthermore during operation the elastic interconnecting structure will maintain a continuous springy action which exerts itself upon the device. This latter factor, according to which the spring means of the invention constantly maintains the plurality of transmission means thereof in wedging engagement with the members 1 and 2, is of considerable importance because during repeated stopping and starting of the rotation of the members 1 and 2 as well as during repeated changes in the direction of rotation plurality of transmission means 3 will tilt. However, in spite of this tilting during stopping and starting or during a change in the direction of rotation the plurality of transmission means 3 will nevertheless be maintained reliably pressed in wedging motion-transmitting engagement with the members 1 and 2 at all times as a result of the force derived from the prestressed spring means 5. Thus, there will be no time during which any transmission means 3 is displaced out of engagement with either of the members 1 or 2, irrespective of how the structure is operated.

Furthermore, even where the entire assembly is of an extremely small size, as where it is required to transmit rotation between relatively small members 1 and 2, it is nevertheless still possible with such small assemblies to provide a relatively large number of transmission means 3 which are capable of transmitting the required force between the members 1 and 2.

Also, the forces which act radially on the plurality of transmission means 3 serve additionally to fix them in their axial direction, so that in almost all cases it is unnecessary to provide any further structure for axially positioning the device of the invention.

Furthermore, even in the case where the members 1 and 2 do not have hardened surfaces engaged by the device of the invention, the required forces can nevertheless still be transmitted between these members 1 and 2 without exceeding a permissible pressure on these surfaces. A relatively small degree of plastic deformation of the surfaces, if it takes place, will only result in enlargement of the area of contact between the members 1 and 2 and the device of the invention so that an equilibrium condition is achieved where the force is distributed over a sufficiently large area to provide the required transmission without exceeding a permissible specific pressure per unit of area.

What is claimed is:

1. Device for transmitting rotary movement between an inner rotary member and an outer rotary member surrounding and spaced from said inner rotary member and defining an annular space therewith, a plurality of transmission means spaced from each other in and distributed along said annular space and wedged against said members for transmitting rotary movement therebetween, and each transmission means being wedged against said members for transmitting rotary movement in an opposite direction from the direction in which rotary movement is transmitted by an immediately preceding and an immediately following transmission means, so that in said annular space successive transmission means respectively turn said members in opposite directions.

2. The combination of claim 1 and wherein each transmission means is symmetrical with respect to the immediately preceding transmission means and the immediately following transmission means.

3. The combination of claim 1 and wherein a plurality of prestressed spring means are respectively situated between and interconnect all of said transmission means for urging them against said members so that each of said transmission means is situated between a pair of said spring means and each transmission means being urged by the pair of spring means between which it is situated away from the immediately preceding and immediately following transmission means.

4. The combination of claim 3 and wherein each of said transmission means has an inner portion pressed against said inner member and an outer portion pressed against said outer member while each of said spring means also has an inner portion pressed against said inner member and an outer portion pressed against said outer member, and the distance between said inner and outer portions of said spring means, in the unstressed condition thereof, being greater than the distance between said inner and outer portions of said transmission means 5. The combination of claim 3 and wherein all of said transmission means and all of said spring means form parts of a continuous spring steel band.

6. The combination of claim 1 and wherein each transmission means has an inner portion pressed against said inner member and a outer portion pressed against said outer member, and each transmission means including an intermediate plate portion extending between said inner and outer portions thereof, all of said transmission means being distributed about a predetermined axis and each of said intermediate plate portions of each transmission means extending substantially parallel to but being inclined with respect to a plane which contains said axis, and said inner and outer portions of each transmission means forming lateral projections of said intermediate plate portion respectively extending in opposite circumferential directions about said axis and each being curved about an axis which is substantially parallel to said first-mentioned axis.

7. The combination of claim 6 and wherein each lateral projection of each transmission means has a radius of curvature which is greater than the radius of curvature of a motion-transmitting wedge element of a conventional overrunning clutch.

8. The combination of claim 1 and wherein said members are made of relatively soft materials, a pair of relatively thin hard rings situated in said space and pressed against said members, all of said transmission means being situated between and pressing against said relatively hard rings so that the latter transmit the rotary movement from said transmission means to said members while protecting the latter from the pressure of said plurality of transmission means.

9. The combination of claim 1 and wherein all of said transmission means are distributed about a predetermined longitudinal axis, and each transmission means including inner and outer portions respectively pressing against said inner and outer members and an intermediate plate portion situated between said inner and outer portions and being substantially parallel to but inclined with respect to a plane which contains said longitudinal axis, said inner and outer portions of each transmission means being formed by lateral projections of said plate portions which respectively extend in opposite circumferential directions from said intermediate plate portion around said longitudinal axis, and each of said lateral projections also being curved substantially circumferentially around a second axis which extends transversely with respect to said first axis so that each lateral projection has an exterior convex surface engaging one of said members and curved both with respect to said longitudinal and with respect to said transverse axis to substantially form part of a sphere so that said transmission means also act to compensate for lack of alignment between the axes of said inner and outer members, respectively.

10. The combination of claim 1 and wherein a plurality of spring means are respectively situated between all of said transmission means with each transmission means connected to and followed and preceded by a spring means and with all of said spring means and all of said transmission means being situated one directly next to the other and forming a continuous ring structure situated in said space.

11. The combination of claim 1 and wherein each transmission means has an inner portion engaging said inner member, an outer portion engaging said outer member, and an intermediate plate portion extending between said inner and outer portions and extending parallel to but being inclined with respect to a plane which contains an axis around which all of said transmission means are distributed, so that when wedged between said inner and outer members each plate portion is situated substantially in a given plane which contains the lines of engagement between said inner and outer portions of each transmission means and said inner and outer members, respectively, and said given plane forming a predetermined angle with a plane which contains one of said lines of engagement and said axis around which all of said transmission means are distributed.

12. The combination of claim 1 and wherein all of said transmission means are distributed around a predetermined axis, each distributing means including inner and outer portions respectively pressing against said inner and outer members and an intermediate plate portion extending between said inner and outer portions and extending parallel to but being inclined with respect to a plane which contains said predetermined axis, and each plate portion having a plurality of reinforcing ribs distributed along and extending substantially perpendicularly with respect to said predetermined axis.

13. The combination of claim 1 and wherein all of said transmission means are distributed about a predetermined axis, each transmission means having an inner portion pressing against said inner member and an outer portion pressing against said outer member and an intermediate plate portion extending between said inner and outer portions and being parallel to but inclined with respect to a plane which contains said predetermined axis, the inclination of the plate portion of each transmission means being opposite to the inclination of the plate portion of its immediately preceding and immediately following transmission means so that each plate portion defines with the immediately preceding plate portion a space which tapers in one direction with respect to said predetermined axis and with the immediately following plate portion a space which tapers in the opposite direction with respect to said predetermined axis, so that each tapered space has a narrow end and an opposed wide end, and said inner and outer portions of each transmission means being in the form of lateral projections extending from each plate portion respectively in opposed circumferential directions with respect to said predetermined axis, the lateral projections of each pair of successive plate portions extending toward each other at the narrow end of each tapered space, and a leaf spring situated in each tapered space, having in a plane normal to said predetermined axis a substantially keyhole configuration, and having a pair of legs extending integrally from the pair of lateral projections of each pair of successive plate portions at the narrow end of the tapered space therebetween while also having distant from said legs a curved intermediate portion situated in the wider end of the tapered space and pressing against the member which is situated at the wider end of the tapered space so that each leaf spring urges the pair of transmission means to which it is connected apart from each other at their lateral projections which are situated at the narrow end of each tapered space, whereby said leaf springs urge said plurality of transmission means into wedging engagement with said members and form with said plurality of transmission means a continuous band.

14. The combination of claim 13 and wherein each leaf spring has a thickness which is substantially less than the thickness of each transmission means.

15. The combination of claim 14 and wherein each leaf spring is formed with cutouts which provide each leaf spring, when it is in a flat condition, with a substantially X-shaped configuration having a pair of intersecting bar portions which cross each other and which intersect at the curved portion of each leaf spring which is distant from said legs thereof.

16. A method of manufacturing a device for transmitting rotary motion between an inner member and an outer member which surrounds and is spaced from said inner member to define therewith an annular space in which the device is to be situated, comprising the steps of bending a continuous spring steel endless band of initially uniform width and thickness into a wavy configuration providing the band with successive U-shaped portions which are successively directed oppositely with respect to an axis around which said band extends, so that said band has outer and inner circumferential wall portions successively distributed about said axis with each outer wall portion connected at its ends by a pair of plate portions to each pair of successive inner wall portions, stamping out parts of said wall portions to form openings therein which give said wall portions an X-shaped configuration and compressing said wall portions to reduce the thickness and increase the length thereof, so that there remains between said wall portions substantially Z-shaped sections including said plate portions and a pair of inner and outer lateral projections extending respectively from inner and outer ends of each plate portion in opposed circumferential directions with respect to said axis, said plate portions and lateral projections all forming a plurality of transmission means while said wall portions form spring means situated therebetween, and bending each wall portion substantially into a keyhole configuration situated between each pair of successive plate portions to form therefrom a spring means which will urge each pair of successive plate portions apart from each other.

17. The method of claim 16 and wherein the compressing of said wall portions to reduce the thickness thereof increases the length thereof to an extent which will provide for each spring means of keyhole configuration a length transversely to said axis which is greater than the length of each plate portion transversely to said axis in the unstressed condition of the device.

References Cited
UNITED STATES PATENTS
| | | | |
|---|---|---|---|
| 2,096,039 | 10/1937 | Higgins | 64—15 |
| 3,080,733 | 3/1963 | Crankshaw | 64—15 |
| 3,279,217 | 10/1966 | Fawick | 64—15 |

FOREIGN PATENTS
22,605 10/1913 Great Britain.

HALL C. COE, *Primary Examiner.*

U.S. Cl. X.R.

29—173